United States Patent [19]

Bachmann et al.

[11] Patent Number: 5,039,715

[45] Date of Patent: Aug. 13, 1991

[54] PHOTOCURABLE ACRYLATE ADHESIVE CONTAINING PERESTER/TAUTOMERIC ACID ADHESION PROMOTER

[75] Inventors: Andrew G. Bachmann, Harwinton; James M. Hillman, Torrington, both of Conn.

[73] Assignee: Dymax Corporation, Torrington, Conn.

[21] Appl. No.: 573,395

[22] Filed: Sep. 19, 1990

Related U.S. Application Data

[62] Division of Ser. No. 37,464, Apr. 13, 1987, Pat. No. 4,964,938.

[51] Int. Cl.$^5$ .............................. C08F 2/50; C08F 4/34; C08F 26/02; C08F 22/02
[52] U.S. Cl. ........................................ 522/13; 522/24; 522/96; 526/301
[58] Field of Search ...................................... 522/13, 24

[56] References Cited

U.S. PATENT DOCUMENTS

| | | | |
|---|---|---|---|
| 3,772,404 | 11/1973 | Knight | 260/859 |
| 3,862,021 | 1/1975 | Hagihara et al. | 204/159.15 |
| 4,065,587 | 12/1977 | Ting | 427/54 |
| 4,210,713 | 7/1980 | Sumiyoshi et al. | 430/284 |
| 4,214,965 | 7/1980 | Rowe | 204/159.15 |
| 4,429,088 | 1/1984 | Bachmann | 526/135 |
| 4,477,327 | 10/1984 | Cassatta et al. | 204/159.15 |
| 4,533,446 | 8/1985 | Conway et al. | 204/159.24 |
| 4,536,267 | 8/1985 | Ito et al. | 204/159.23 |
| 4,605,465 | 8/1986 | Morgan | 156/273.3 |
| 4,609,612 | 9/1986 | Berner et al. | 430/281 |
| 4,620,954 | 11/1986 | Singer et al. | 522/13 |
| 4,680,368 | 7/1987 | Nakamoto et al. | 528/49 |

*Primary Examiner*—Roland Martin
*Assistant Examiner*—Arthur H. Koecker
*Attorney, Agent, or Firm*—Ira S. Dorman

[57] ABSTRACT

A reactive acrylic adhesive, activated by actinic radiation, includes, in addition to a photoinitiator, at least about 1.0 percent by weight of a perester compound or cumene hydroperoxide, and 0.5 percent of a tautomeric organic acid, for enhanced bond strength.

10 Claims, No Drawings

PHOTOCURABLE ACRYLATE ADHESIVE CONTAINING PERESTER/TAUTOMERIC ACID ADHESION PROMOTER

This is a divisional of copending application Ser. No. 07/037,464 filed on 4/13/87, now U.S. Pat. No. 4,964,938.

BACKGROUND OF THE INVENTION

Reactive acrylic adhesives are well known in the art, and are widely utilized due to the numerous advantageous characteristics that they exhibit. Curing of such adhesives may be activated by heat and/or various chemical initiators, and the use of actinic radiation (particularly in the ultraviolet region of the spectrum) has taken on considerable importance in recent years. Although such compositions are commercially available, which cure to strong adhesives, increases in bond strength will usually be considered advantageous, and high bond strength will in fact be a fundamental criterion for certain applications.

Accordingly, it is the broad object of the present invention to provide a novel reactive acrylic adhesive composition that is activated by radiation and that cures to produce a solid adhesive material that exhibits high levels of bond strength, particularly to glass.

It is also an object of the invention to provide a novel method for bonding surfaces, and especially surfaces of glass, utilizing such an adhesive composition.

SUMMARY OF THE INVENTION

It has now been found that certain of the foregoing and related objects of the invention are readily attained by the provision of a liquid composition comprising a major proportion of polymerizable acrylate monomer and a filler providing elastomeric domains, an effective amount of an actinic radiation-responsive photoinitiator, about 1.0 to 5.0 percent, based upon the weight of the composition, of a perester compound, and about 0.5 to 5.0 weight percent of an organic acid that is capable of cyclic tautomerism, the composition being free from stabilizers containing sulfur and/or the amine functionality. Preferably, the perester compound will be selected from the group consisting of tert-butyl perbenzoate and tert-butyl peroctoate, although other peresters, such as di-tert-butyl diperphthalate and 2,5-dimethyl-2,5-bis(benzoylperoxy)hexane, may also be used.

Generally, the filler employed will be a reactive acrylated polyurethane oligomer having a molecular weight of about 400 to 6000; preferably, it will be a diisocyanate-capped polyether acrylated by reaction with hydroxyethyl acrylate or methacrylate. The acrylate monomer will preferably be isobornyl acrylate, hydroxyethyl methacrylate, polyethyleneglycol dimethacrylate, trimethylcyclohexyl acrylate, and mixtures of the foregoing. Phenyl ketones, such as 1-hydroxycyclohexylphenyl ketone and 2,2-dimethoxy-2-phenyl acetophenone, will often be preferred for use as the photoinitiator.

The amounts of the ingredients will preferably be in the ranges of about 2.0 to 4.0 percent of the perester compound, about 1.0 to 2.0 percent of the tautomeric acid, about 30 to 60 percent of the monomer, about 5 to 60 percent of the filler, and about 1.0 to 5.0 percent of the photoinitiator, all based upon the weight of the composition. Most desirably, the composition will additionally include acrylic acid, generally used in an amount of about 2.0 to 6.0 weight percent, although as little as 1.0 percent and as much as 10.0 percent may be effective and desirable.

Additional objects of the invention are attained by the provision of an adhesive composition containing the ingredients and the amounts thereof set forth above, but wherein cumene hydroperoxide is substituted for the perester compound. Surprising increases in bond strength are also achieved with such an adhesive, using about 1.0 to 5.0, and preferably about 2.0 to 4.0, weight percent of cumene hydroperoxide.

Other objects of the invention are attained by the provision of a bonding method, in accordance with which the adhesive composition hereinabove described is applied to at least one of the surfaces to be bonded. After effecting contact between the surfaces, the composition is exposed to actinic radiation for a period of time sufficient to effect curing to an adhesive solid. The method of the invention will often be employed to greatest advantage for the bonding of parts on which at least one of the surfaces is glass, and a specific application is for the bonding of glass to stainless steel, as in the fabrication of hypodermic syringes.

DETAILED DESCRIPTION OF THE PREFERRED EMBODIMENTS

Exemplary of the efficacy of the present invention are the following Examples:

EXAMPLE ONE

A control adhesive composition ("A") is prepared by admixing the following ingredients in the amounts indicated (in parts by weight): 3090 parts of an acrylated polyurethane (toluene diisocyanate-capped polyether having a molecular weight of about 400, acrylated by reaction with hydroxyethyl methacrylate); 3708 parts isobornylacrylate (IBOA), free of sulfur and amine-containing stabilizers; 2163 parts hydroxyethyl methacrylate (HEMA); 618 parts acrylic acid; 93 parts of a silane adhesion promoter; 25 parts of a hydroquinone stabilizer; and 124 parts of 1-hydroxycyclohexylphenyl ketone, as a photoinitiator. A series of adhesive compositions (B-F) are produced by adding about 2.0 percent of tert-butyl perbenzoate to composition A, based upon the weight thereof, and the indicated percentage (on the same basis) of maleic acid: zero (composition B); 0.5% (C); 1.0% (D); 1.5% (E) and 2.0% (F).

A quantity of each adhesive composition is applied to the clean, fresh surface of a small piece of cold rolled steel, and a piece of window glass (with a surface cleaned to free it of any contamination) is brought into surface contact with the steel piece to spread the adhesive between them. The assembly is then exposed through the glass to a beam of UV light (300-400 nanometers) for a period of one minute, following which the parts are tested for bond strength in a tension measuring machine.

Composition B (perester only added) is found to exhibit a dramatic increase in bond strength over A. Composition C (perester and 0.5% maleic acid) shows a further substantial improvement, and the strength of the bond produced by composition D (perester and 1.0% maleic) is very substantially higher than that of B (on the order of 50% greater). The improvement is maintained in compositions E and F (1.5% and 2.0% levels of maleic acid, respectively) albeit at a somewhat diminished level.

Utilizing the same perester at various concentrations ranging between about 1.0 to 4.0 weight percent produces comparable results, as does substitution of tert-butyl peroctoate for tert-butyl perbenzoate, in equivalent amounts. Excellent results are achieved by using composition D (described above and cured by UV radiation) to bond stainless steel hypodermic syringe needles to the glass barrels.

EXAMPLE TWO

A composition the same as composition D described in Example One is prepared, substituting however 2.0 weight percent of cumene hydroperoxide for the tert-butyl perbenzoate. When tested in the same way for effectiveness in adhering steel to glass, an unexpected increase in bond strength, of comparable magnitude, is noted.

The acrylate monomer employed in the instant compositions will generally be a reaction product of acrylic acid and/or methacrylic acid with one or more mono- or polybasic, substituted or unsubstituted, alkyl ($C_1$ to $C_{18}$), aryl or aralkyl alcohols. Preferred acrylates will often be those in which the alcohol moiety contains a polar substituent (e.g., an hydroxyl, amine, halogen, cyano, heterocyclic or cyclohexyl group), since cross-linking or other intermolecular bonding is promoted thereby. General disclosure of suitable acrylic ester monomers are provided in the prior art, such as in U.S. Pat. Nos. 3,218,305 (line 65, column 1 through line 47, column 2); 3,425,988 (line 49, column 2 through line 21, column 3); 3,651,036 (line 69, column 1 through line 12, column 2); 3,658,624 (line 74, column 1 through line 58, column 2); 3,826,756 (line 49, column 2 through line 5, column 3); and 3,855,040 (line 20, column 3 through line 55, column 4), which portions of the foregoing specifications are hereby incorporated by reference into this specification. It is believed that the choice of appropriate monomers will be evident to those skilled in the art, and that further generalized description thereof will therefore be unnecessary.

Nevertheless, it might be pointed out that specific acrylates which can advantageously be employed, alone or in combination, include (in addition to the HEMA and IBOA used in the foregoing Example) the tetraethyleneglycol, isodecyl and hydroxyethyl esters of acylic acid; the butyl, isodecyl, methyl, tetrahydrofurfuryl, isobornyl, and dicyclopentadienyl esters of methacrylic acid; diacrylates, triacrylates and tetracrylates (i.e., the polyacrylic and polymethacrylic esters) of butyleneglycol, triethyleneglycol, tetraethyleneglycol, polyethylene glycol, bisphenol A, pentaerythritol (particularly the triacrylate ester), trimethylcyclohexyl acrylate, and the like.

Turning now more specifically to the filler, virtually any material that is soluble (to at least a significant degree) in the monomer fraction, and that serves to toughen, flexibilize and/or strengthen the cured adhesive, may be used. The filler need not be introduced as a rubbery solid; liquids and waxy substances are also entirely suitable. It is most desirable that the filler be reactive with the monomeric components to produce intermolecular bonding, since that will enhance compatibility and tend to maximize the ultimate properties of the adhesive. In any event, it is believed that the effective fillers toughen or otherwise desirably modify the adhesive by dispersing in the momomer formulation to provide elastomeric domains; generally, they will be rubbery or elastomeric materials, thermoplastic polymers, or macromers.

Although the selection of specific appropriate elastomeric domain-providing fillers will be evident to those skilled in the art, it might be mentioned that typical suitable materials include vinyl polymers, acrylic polymers, polyester elastomers, glycol polymers, acrylated epoxies, natural and synthetic rubbers, and the like. More particularly, fillers such as VINAC B-7 (polyvinyl acetate sold by Airco Chemical Company), polyethyleneglycol 6000, HYCAR CTBN and HYCAR 1022 (liquid rubbers sold by the B. F. Goodrich Chemical Company), X-80 (polyester oligomer sold by Union Carbide Corporation), and KM-229, KM-288 and KM-323B (arylic elastomers sold by the Rohm & Haas Company) are advantageously used in the formulations of the invention.

In many instances, the urethane polymers and prepolymers will be preferred, with the latter being especially desirable due to the potential that they afford for further reaction of their pendant isocyanate groups with a reactive functionality (e.g., an hydroxyl group) provided by a suitable acrylate monomer. Typical specific urethane elastomers that are advantageously used include the rubber sold by B. F. Goodrich Chemical Company under the trade designation ESTANE 5730, and the prepolymers sold respectively by Witco Chemical Company and by N. L. Industries under the designations CASTOMER 0002 and VORITE. Particularly preferred are such urethanes capped with an acrylic monomer, such as the polyacrylate esters of organic polyisocyanates described as "monomers" in the above-mentioned U.S. Pat. No. 3,425,988 (the portion of the disclosure thereof in column 2, line 35 through column 4, line 58 is hereby incorporated hereinto by reference). In view of all of the foregoing, however, it will be appreciated that the selection of a particular elastomeric domain-providing filler is not critical, and that the specific material used may vary widely, depending upon the application for, and the properties desired in, the adhesive.

The amount of filler utilized will depend upon several factors, including again the properties desired in the ultimate product, the nature of the components employed, and the like. Generally, at least about 5.0 and less than about 90.0 weight percent will be used; in the preferred compositions the filler will normally constitute about 20 to 50 weight percent.

As will be appreciated, a primary feature of the instant compositions resides in the use of a perester compound. Although the perester compounds employed in the instant compositions are widely used for the initiation of free-radical reactions, they are not employed as catalysts here. Curing of the present adhesives is achieved by activation of the photoinitiator, using radiation of appropriate wave number; there is no need to subject the material to heat or chemical activation, as is necessary, from a practical standpoint, to produce catalytic activity in the peresters. This is indicated by Example One, wherein addition of the perester compound alone to composition A (to produce composition B) results in a dramatic increase in bond strength, which is not believed to be attributable to enhanced curing of the composition (albeit that, in some instances, the perester may function to increase curing in "shadow" areas, i.e., areas that are not subjected to the full-strength radiation beam).

The same comments as are made above also apply to the use of cumene hydroperoxide. Although not a perester, it has been found (as indicated by Example Two) to be highly effective in producing enhanced bond strength to glass; this is not believed to be true in regard to all peroxygen compounds that are typically used as catalysts.

The tautomeric acid constituent also contributes very substantially to bond strength, achieving rather dramatic increases when employed at optimal concentrations. Although maleic acid is preferred, other acids capable of cyclic tautomerism can also be used; such acids include malic, salicyclic, itaconic and phthalic. To avoid possible misunderstanding, perhaps it should be pointed out that the term "cyclic tautomerism", as used herein, refers to that capability of the acid to theoretically exist in a state in which a bond or pseudo bond is formed between the carboxylic moieties of the acid, to produce an isomer in which those moieties are in ring-like configuration, in equilibrium with a non-cyclic isomer.

The present combination of ingredients produces particularly desirable results in regard to the bonding of glass surfaces. Although silane compounds are conventionally utilized for enhancement of that property in products heretofore available, and is desirably incorporated into the instant compositions as well, surprising increases in bond strength to glass result from the combinations herein provided, when cured by actinic radiation. Since silane is a coupling agent for glass, and the peresters, cumene hydroperoxide and the tautomeric acids are not, the increases in bond strength would not have been expected.

It has also been found that virtually any compatible photoinitiator may be employed in the instant compositions, and appropriate compounds will be evident to those skilled in the art. Nevertheless, it might be noted that 1-hydroxycyclohexylphenyl ketone, 2,2-dimethoxy-2-phenyl acetophenone, diethoxy acetophenone, and 2-methyl-1-(methylethiophenyl)-2-(4-morpholinyl)-1-propanone can be used to good effect for response to actinic radiation in the UV range, as is preferred, and camphroquinone and suitably sensitized compositions using the above-listed photoinitiators can, for example, be employed in visible-light reactive systems; other appropriate initiators include benzophenone, benzil, tetramethyldiaminobenzophenone (Michler's ketone), benzoin ethers, alpha,alpha-diethoxy-acetophenone and ketocoumarins. Typically, about 1.0 to 5.0 weight percent, and preferably about 2.0 to 4.0 percent, of the photoinitiator will be employed, although amounts as low as 0.1 percent, and as high as 10.0 percent, may be effective and desirable in some instances.

In addition to the principal components hereinabove described, it will be evident that other ingredients may also be incorporated into the instant compositions. For example, acrylic acid, used in the amounts indicated, is especially desirable from the standpoint of maximizing adhesion and curing rate; "inert" fillers, such as wood flour, glass fibers, cotton linters, mica, alumina, silica, and the like, are conventionally used to modify viscosity, improve impact resistance, and for other purposes, and they may be employed in the instant compositions if so desired. As indicated above, it is also conventional to include small percentages of silane monomers to increase moisture resistance as well as to enhance the bond strength of the adhesive to glass and similar surfaces, and incorporation of such monomers into the compositions hereof is therefore especially desirable. Other substances such as dyes, fire retarders, stabilizers (e.g., the quinones and hydroquinones), thixotropes, thickeners, viscosity reducers, plasticizers, antioxidants, and the like, may additionally be incorporated, although it will be appreciated that such additives will often be furnished in the principal ingredients, making their separate introduction unnecessary.

Despite the fact that all of the compositions of the invention exhibit adhesive properties, it will of course be understood that they can be used for other purposes as well. For example, they may serve as coatings, for applications in which gap-filling is of primary importance, etc.

It is important to note that the present compositions exclude stabilizers containing sulfur and/or the amine functionality, which are found to have a most detrimental effect upon the properties of the adhesive. Regard for this restriction is especially important in those instances in which the monomer portion comprises isobornyl acrylate, because phenothiazine (or a like stabilizer) is normally used to stabilize IBOA, absent a special order to the manufacturer.

Thus, it can be seen that the present invention provides a novel reactive acrylic adhesive composition that is activated by actinic radiation and that cures to produce a solid adhesive material having high bond strength, most notably and unexpectedly to glass. The invention also provides a novel method for bonding surfaces utilizing such an adhesive composition, which method is especially well adapted for bonding glass surfaces.

Having thus described the invention, what is claimed is:

1. A liquid composition capable of reaction to an adhesive solid, when exposed to actinic radiation, comprising a major proportion of at least one polymerizable acrylate monomer and an elastomeric domain-providing filler, an effective amount of an actinic radiation-responsive photoinitiator and, based upon the weight of said composition about 1.0 to 5.0 percent of a perester compound having free radical-initiating capability and about 0.5 to 5.0 percent of an organic acid capable of cyclic tautomerism, said composition being free from stabilizers containing sulfur or the amine functionality.

2. A liquid composition capable of reaction to an adhesive solid, when exposed to actinic radiation, comprising a major proportion of at least one polymerizable acrylate monomer and an elastomeric domain-providing filler, an effective amount of an actinic radiation-responsive photoinitiator and, based upon the weight of said composition, about 1.0 to 5.0 percent of cumene hydroperoxide, and about 0.5 to 5.0 percent of an organic acid capable of cyclic tautomerism, said composition being free from stabilizers containing sulfur or the amine functionality.

3. A liquid composition capable of reaction to an adhesive solid when exposed to actinic radiation, comprising about 30 to 60 percent of at least one polymerizable acrylate monomer, about 5 to 60 percent of an acrylated polyurethane oligomer having a molecular weight of about 400 to 6000, about 1.0 to 5.0 percent of an ultraviolet radiation-responsive photoinitiator, about 2.0 to 6.0 percent of acrylic acid, about 2.0 to 4.0 percent of a compound selected from the class consisting of a perester compound having free radical-initiating capability and cumene hydroperoxide, and about 1.0 to 2.0 percent of an organic acid capable of cyclic tautomerism, all based upon the weight of said compound, said composition being free from stabilizers containing sulfur or the amine functionality.

4. A liquid composition capable of reaction to an adhesive solid, when exposed to actinic radiation, comprising a major proportion of at least one polymerizable acrylate monomer and an elastomeric domain-providing filler, an effective amount of an actinic radiation-responsive photoinitiator and, based upon the weight of said composition, about 1.0 to 5.0 percent of tert-butyl peroctoate and about 0.5 to 5.0 percent of an organic acid capable of cyclic tautomerism, said composition being free from stabilizers containing sulfur or the amine functionality.

5. The composition of claims 1 or 3 wherein said perester compound is selected from the group consisting of tert-butyl perbenzoate and tert-butyl peroctoate, and wherein said organic acid is maleic.

6. The composition of claims 1 or 2 or 4 wherein said filler is an acrylated polyurethane oligomer.

7. The composition of claim 6 wherein said oligomer has a molecular weight of about 400 to 6000, and is a diisocyanate-capped polyether acrylated by reaction with hydroxyethyl acrylate or hydroxyethyl methacrylate.

8. The composition of claims 1 or 2 or 3 or 4 wherein said acrylate monomer is a compound selected from the group consisting of isobornyl acrylate, hydroxyethyl methacrylate, polyethyleneglycol dimethacrylate, trimethylcyclohexyl acrylate, and mixtures thereof.

9. The composition of claims 1 or 2 or 3 or 4 wherein said photoinitiator is a compound selected from the group consisting of diethoxy acetophenone, 1-hydroxycyclohexylphenyl ketone, 2-methyl-1-(methylthiophenyl)-2-(4-morpholinyl)-1-propanone, and 2,2-dimethoxy-2-phenyl acetophenone.

10. The composition of claims 1 or 2 or 4 additionally including about 2.0 to 6.0 percent by weight thereof of acrylic acid.

* * * * *